A. BENEDICT.
GRAB HOOK.
APPLICATION FILED APR. 22, 1911.
1,007,637.
Patented Oct. 31, 1911.
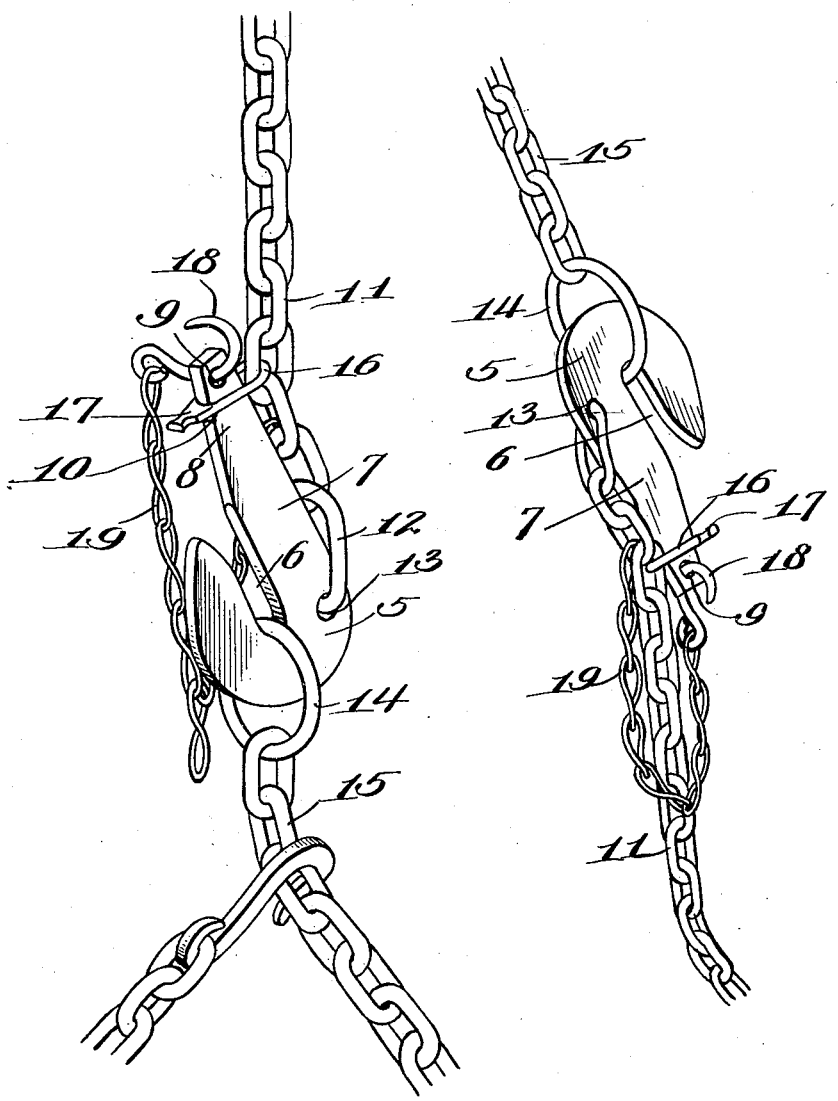
Witnesses:
Inventor
Austin Benedict

UNITED STATES PATENT OFFICE.

AUSTIN BENEDICT, OF MERRILL, WISCONSIN.

GRAB-HOOK.

1,007,637.  Specification of Letters Patent.  Patented Oct. 31, 1911.

Application filed April 22, 1911. Serial No. 622,733.

*To all whom it may concern:*

Be it known that I, AUSTIN BENEDICT, a citizen of the United States, residing at Merrill, in the county of Lincoln and State of Wisconsin, have invented new and useful Improvements in Grab-Hooks, of which the following is a specification.

This invention relates to new and useful improvements in trip grab hooks for chains and particularly devised for use in logging; and the primary object of the same is to produce a simple and effective device of this kind having positively operating means for reliably holding the hook in proper position when the chain with which it operates is applied about logs or other devices and also embodying an organization whereby the hook may be readily detached to release the chain without liability of injury to the operator.

With this and other objects and advantages in view the invention consists in the construction and arrangement of the several parts which will be more fully hereinafter described and claimed.

In the drawing: Figure 1 is a perspective view of the improved grab hook and the coöperating chains and illustrated in position for supporting a log or other device. Fig. 2 is a view similar to Fig. 1 showing the hook applied in reverse preferred position to compensate for shifting movement of the bound logs.

The grab hook embodying the features of the invention comprises a hook extremity 5 having a deep throat 6 and a shank 7 continuing from the hook extremity and reduced in width toward its free end as at 8. The free end of the shank is formed with an eye or opening 9, and the front edge, or that continuing into the throat 6 at a point adjacent to the eye 9, is constructed with a recess or groove 10.

As shown by Fig. 1, a chain or analogous device 11 is attached to the hook in the usual manner, that is, by a link 12 passed through an opening 13 eccentrically positioned relatively to the hook as an entirety, so that when the hook is released it will be overthrown or disposed in such position as to effect a quick disengagement of the ring 14 of the log engaging chain or analogous device 15, the said ring 14, as usual, being held in the throat 6. To effectively hold the hook in locked or secured position, a catch link 16 is used and secured in one of the links of the chain 11, said catch link having a reduced free end 17 which is preferably grooved for the attachment thereto of a pull-cord or other device. The catch link 16 is thrown over the reduced end of the shank 7 of the hook and is caused to engage the groove 10, and the reduced extremity 17 thereof projects outwardly a considerable distance from the adjacent edge of the reduced extremity of the shank, and in some instances may be released by striking the same with a hammer or other device; or as above indicated, a pull-cord may be attached to the said extremity 17. To insure a reliable retention of the link 16 over the reduced extremity of the shank 7 of the hook and to safely lock the latter, a locking hook 18 is provided and inserted through the eye 9, said hook 18 being secured to a chain 19 which in turn is attached to the chain 11. By the use of the locking hook 18 any tendency to accidental disengagement of the catch link 16 from the shank 7 of the hook is prevented.

As shown by Fig. 1, the hook is applied and used in the usual manner.

Fig. 2 shows the improved hook applied in a preferred manner or in a position reverse to that shown by Fig. 1 and illustrates an advantage which is not present in hooks of this type as heretofore constructed. It frequently happens that a load of logs will shift position and in doing so slacken the enveloping chain engaged by the hook with the result, in using ordinary forms of hooks, that said hooks become detached. The improved form of hook, in the arrangement shown by Fig. 2, maintains its hold on a slack chain. In the arrangement shown by Fig. 2 the chain 11 becomes the attaching means for the hook and the chain 15 having the ring 14 a free chain thrown over a load of logs. It will be noted that no matter what the strain on the chain 11, as shown by Fig. 2, may be, the link 16 will be held intact with the reduced end of the shank 7 or said link 16 will be prevented from being drawn off the shank, particularly when the hook 18 is applied. The hook as arranged in Fig. 2 will automatically compensate for displacement of the load of logs and slackening of the binding chain without becoming disengaged from the latter, and the binding chain or the chain thrown loosely over the logs may be caused to engage the hook throat 6 in any manner desired.

It will be understood that in releasing the hook the locking hook 18 will be first detached and the catch link 16 struck or pulled off the reduced end of the shank 7, thus releasing the grab hook and permitting the latter to overturn for easy disengagement from the chain or chain member with which it coöperates. In applying the hook the shank 7 is turned up or over adjacent to the chain 11 and the catch link 16 thrown over the reduced extremity of said shank and locked by the hook 18.

The improved grab hook will be found exceptionally advantageous and convenient for the purpose for which it has been devised, and it will be understood that changes in the proportions, dimensions and minor details may be resorted to without departing from the spirit of the invention.

What is claimed as new is:

1. A grab hook of the class specified embodying a shank having a reduced extremity with a groove in one edge and an eye therethrough above the groove, combined with a draft chain eccentrically attached to the shank in rear of the hook, a catch link carried by the draft chain and movable over the reduced extremity of the shank of the hook to engage the said groove, and a safety locking hook having a connecting chain attached to said draft chain to removably engage the eye above the catch link to prevent accidental disengagement of the latter.

2. A grab hook of the class specified embodying a shank reduced toward its free extremity and having a groove in one edge, a flexible draft device eccentrically attached to the shank in rear of the hook portion of the latter, a catch link carried by the draft device and movable over the free extremity of the shank of the hook to engage the said groove, and safety means having a flexible connection attached to the draft device and removably applied between the catch link and the free end of the shank of the hook.

In testimony whereof I have hereunto set my hand in presence of two subscribing witnesses.

AUSTIN BENEDICT.

Witnesses:
FRANCIS E. MATHEWS,
S. J. KLINE.

---

Copies of this patent may be obtained for five cents each, by addressing the "Commissioner of Patents, Washington, D. C."